UNITED STATES PATENT OFFICE 2,391,988

COMBUSTIBLES

Clarence M. Loane, Hammond, Ind., and Roger W. Watson, Chicago, Ill., assignors to Standard Oil Company, Chicago, Ill., a corporation of Indiana No Drawing. Application March 30, 1942, Serial No. 436,840

9 Claims. (Cl. 44—7.5)

This invention relates to improved combustibles and the like and more particularly to wickless candles, flares, torches, etc.

It is an object of the present invention to provide a wickless illuminant such as a candle, flare or the like capable of prolonged and persistent burning. Another object of the invention is to provide individual, conveniently handled cooking units, suitable for cooking in place of a camp fire. Another object of the invention is to provide a means of increasing the burning properties of wax and the like. Still another object of the invention is to provide a means of burning a mass of wax without the need of a wick. Other objects and advantages of the invention will become apparent from the following description thereof.

In accordance with the invention the combustibility of combustible substances is materially improved and enhanced by admixture therewith of from about 1% to about 30% of an aerogel. Waxes, such as paraffin wax, ester waxes, petrolatums, crude scale wax and the like, asphalts, synthetic hydrocarbon polymers, etc., are illustrative of the type of combustible materials which can be used. Mixtures of waxes, or mixtures of waxes and high molecular weight fatty acids, such as stearic acid can also be used. Illustrative of the aerogels which can be employed are silica aerogel, gelatine aerogel, agar aerogel, cellulose aerogel, thoria aerogel, and aluminum aerogel.

The term "aerogel" is applied to a class of materials that are prepared by drying a gel or a gelatinous substance in such manner that the structure of the solid phase remains unchanged when the diluent is removed; that is, no shrinkage occurs. Gels are composed of many small cells which retain the liquid phase of the gel in much the same fashion as a sponge holds water. When these gels are dried they shrink to a small fraction of their original volume because of the very large capillary forces and the relatively small volume of solid phase usually present. By replacing the liquid present in the gel with a non-peptizing liquid and heating the gel to the critical temperature of the liquid under such pressure that it is allowed to evaporate, the liquid is converted to a gas and can then be released without capillary compressive forces being brought to bear on the solid structure. Dried gels prepared in this manner occupy substantially the same volume as they did before drying but retain a gas within their meshes rather than a liquid. Gels so prepared are known as "aerogels."

Usually in the preparation of aerogels the water present in the aquagel is replaced with alcohol by placing the gel in alcohol and allowing diffusion to take place. The preparation of aerogels is described in Industrial & Engineering Chemistry, vol. 26 (June, 1934), page 658, and vol. 31 (July, 1939), page 827, and in United States Patent No. 2,093,454 to S. S. Kistler.

For a fuller understanding of our invention the same will be described in connection with flares prepared of paraffin wax and silica aerogel. Flares having a persistent and steady flame are prepared by thoroughly mixing from about 2% to about 20% and preferably from about 5% to about 15% of silica aerogel with molten paraffin wax having a melting point of about 120° F. to about 140° F., and rapidly cooling the mixture to avoid excessive settling of the aerogel. Or the mixture of molten paraffin wax and aerogel may be agitated sufficiently to maintain thorough dispersion of the aerogel during cooling until the mix is just slightly above the solidifying point of the aerogel. The mixture of silica aerogel and wax can be molded in any desirable size and shape and later packaged, or the mixture of molten wax and aerogel can be poured into any desirable container, such as a tin container or a wax paper carton, and allowed to solidify in the container. The molded mixture can be coated with a substance that will itself burn, e. g., cellulose acetate, etc. Flares so prepared are easily and readily ignited and will burn with a steady and persistent flame even in high winds. These flares provide a ready source of light and heat and are adaptable for use in small cooking units.

Candles can be made by providing molded wax candles of any desired shape or form with a relatively narrow channel through the center thereof which is filled with a mixture of molten wax and aerogel. Upon solidifying, the wax-aerogel core furnishes an excellent substitute for the wicks ordinarily used in candles.

Illuminants prepared in accordance with the present invention can be made to burn with a colored flame by adding to the wax and aerogel mixture a metal or metallic compound capable of imparting color to the flame, for example, lithium nitrate, strontium nitrate, calcium nitrate and the like may be used. Also, compounds which enhance the burning qualities of the mixture such as potassium chlorate, potassium nitrate, magnesium, $Na_2O_2$, or low concentrations of light liquid hydrocarbons such as gasoline, etc., can be added to the mixture of wax or other combustible substance and aerogel.

Although we have described our invention as applied to candles and flares we do not wish to limit our invention thereto, since our invention is adaptable to increasing the combustion properties of any combustible material by adding thereto relatively small amounts of an aerogel.

While the present invention has been described in connection with certain specific embodiments thereof it is to be understood that there is no intention to be limited thereby, since many modifications and variations may be made without departing from the scope of the invention, which is to be limited only by the appended claims.

We claim:

1. A combustible composition of matter comprising a wax and from about 1% to about 30% of an aerogel.
2. A combustible composition of matter comprising paraffin wax and from about 1% to about 30% of an aerogel.
3. A combustible composition of matter comprising paraffin wax and about 1% to about 30% of silica aerogel.
4. A combustible composition of matter comprising paraffin wax and about 1% to about 30% of alumina aerogel.
5. A combustible composition of matter comprising paraffin wax and about 1% to about 30% of thoria aerogel.
6. A combustible composition of matter comprising a combustible solid hydrocarbon and an aerogel in sufficient quantity to enhance the combustibility of said hydrocarbon.
7. A candle comprising a body of wax and a core comprising a mixture of wax and from about 1% to about 30% of an aerogel.
8. The method of preparing an illuminant comprising mixing molten wax with from about 1% to about 30% of an aerogel and rapidly solidifying said mixture.
9. The method of preparing an illuminant as described in claim 8 in which the aerogel is silica aerogel.

CLARENCE M. LOANE.
ROGER W. WATSON.